United States Patent Office 3,769,254
Patented Oct. 30, 1973

3,769,254
HIGH STRENGTH PRESSURE-SENSITIVE
ADHESIVES
Carl C. Anderson, Gibsonia, and Rudolf Maska and
Suryya K. Das, Pittsburgh, Pa., assignors to National
Starch and Chemical Corporation, New York, N.Y.
No Drawing. Continuation-in-part of abandoned application Ser. No. 26,145, Apr. 6, 1970. This application
Aug. 27, 1971, Ser. No. 175,691
Int. Cl. C08f 45/44
U.S. Cl. 260—33.4 PQ
28 Claims

ABSTRACT OF THE DISCLOSURE

Pressure-sensitive adhesives having improved cohesive strength are obtained by reacting an acrylic interpolymer containing an interpolymerized acrylic monomer containing one or more groups having reactive hydrogen atoms such as a hydroxyalkyl ester or an ethylenically unsaturated carboxylic acid with a metal alkoxide, chelated metal alkoxides such as chelated titanium esters being particularly preferred. Adhesives produced in this manner have improved cohesive strength and shrink resistance on backings while maintaining good tack and adhesive properties.

CROSS REFERENCE TO RELATED APPLICATIONS

This application is a continuation-in-part of application Ser. No. 26,145 filed Apr. 6, 1970, now abandoned.

Pressure-sensitive adhesives, which are normally tacky materials adherent upon application of light pressure, are desirable in a number of industrial applications because they can be used with various materials and are easily adapted to production line techniques. In order to function satisfactorily as a pressure-sensitive adhesive, a composition must provide a combination of properties including good tack, adhesion and cohesive strength, and must adhere instantaneously when applied to substrates of differing surface characteristics. To be useful in many industrial applications, the bond obtained by the use of the adhesive must have sufficient strength to remain firm over relatively long periods and under different and sometimes severe environment conditions.

Most pressure-sensitive adhesives, however, have low relative strength as compared, for instance, to thermosetting resin adhesives, because the desired tack and adhesive properties are ordinarily inconsistent with the high level of cohesive strength obtained with other types of thermosetting resin adhesive polymers. Because of this, attempts to provide pressure-sensitive adhesives having improved cohesive strength have not proven satisfactory, with continuing problems being the tendency of the adhesive to lose strength upon aging and the unsatisfactorily low tack and adhesion which tend to be found with higher strength adhesives of this type.

SUMMARY OF THE INVENTION

The adhesive compositions of the present invention comprise an adhesive polymer formed by the reaction of a metal alkoxide with an interpolymer formed from monomers consisting essentially of (1) at least 40 percent by weight of one or more alkyl acrylates, and (2) at least 0.2 percent by weight of an acrylic monomer containing at least one group having a reactive hydrogen atom. Optional components of the adhesive polymer include other monomers containing an additional copolymerizable ethylenically unsaturated linkage as the only reactive functional group. The preferred metal alkoxides are titanic acid esters and more preferably chelated esters, and it is also particularly preferred that the composition contain a substantial amount of substantially anhydrous alcohol in the solvent in which it is dissolved because of the stabilizing effects of alcohols such as isopropyl alcohol and the like.

The adhesive compositions described herein form dry films or adhesive layers having high cohesive strength, while at the same time retaining good tack and adhesion, and can impart excellent shear strength and shrink resistance to various backing members including any of the various flexible and non-flexible materials with which pressure-sensitive adhesives are desirably employed. They also can be used to produce free films which can be applied in a transfer operation.

DETAILED DESCRIPTION OF THE INVENTION

The adhesive compositions of the invention comprise an adhesive polymer formed by the reaction of an acrylic interpolymer with a metal alkoxide. The acrylic interpolymer is formed of monomers consisting essentially of one or more alkyl acrylates, generally containing up to about 10 carbon atoms in the alkyl group, along with a small proportion of an acrylic monomer containing at least one group having a reactive hydrogen atom such as hydroxyalkyl esters of ethylenically unsaturated carboxylic acids, and ethylenically unsaturated carboxylic acids. The polymer also may include one or more other addition copolymerizable monomers devoid of any functional group except for the polymerizable ethylenic linkage. In many cases it may be desirable to have both copolymerizable monomers containing OH groups and those containing COOH groups in the composition simultaneously.

The alkyl acrylates which form a major essential constituent of the interpolymer are preferably acrylic acid esters of alcohols having up to about 18 carbon atoms. The preferred alkyl acrylates have an average of from about 4 to about 10 carbon atoms in the alkyl groups, and include butyl acrylate, amyl acrylate, hexyl acrylate, heptyl acrylate, octyl acrylate, nonyl acrylate, decyl acrylate, and various isomers of these acrylates, such as isooctyl acrylate. One specific preferred alkyl acrylate for use in the invention is 2-ethylhexyl acrylate. Higher alkyl acrylates can in some instances be used, particularly in combination with the lower alkyl acrylates, whereby the average number of carbon atoms in the alkyl groups is within the desired range.

In most cases it is necessary to have at least about 40 percent by weight of the interpolymer consist of the above alkyl acrylates, having an average of from about 4 to about 10 carbon atoms in the alkyl group and in many preferred interpolymers, 60 percent or more are made up of these monomers.

The interpolymer also includes a small amount of an acrylic monomer containing reactive hydrogen atoms such as hydroxyalkyl esters of ethylenically unsaturated carboxylic acids, ethylenically unsaturated carboxylic acids, and amines formed, for example, by the reaction of propylene imine and a carboxyl-containing polymer. The preferred acrylic monomer containing a reactive hydrogen atom is the ethylenically unsaturated carboxylic acids. The preferred carboxylic acids are acrylic acid, and methacrylic acid, but other copolymerizable acids such as crotonic acid, itaconic acid, and fumaric acid can also be employed. They can also be utilized half esters of unsaturated dicarboxylic acids such as methyl hydrogen fumarate, butyl hydrogen fumarate, ethyl hydrogen maleate, and butyl hydrogen maleate from about 0.2 percent up to about 20 percent by weight of the total weight of the interpolymer can be provided by the interpolymerized acids with the preferred products containing from about 0.3 to about 10 percent by weight of such acids.

Other preferable acrylic monomers containing reactive hydrogen atoms are hydroxy alkyl esters of ethylenically unsaturated acids. The preferred hydroxy alkyl esters are esters of acrylic acid, methacrylic acid, and other alpha-beta ethylenically unsaturated carboxylic acids. Examples include 3-hydroxyethyl acrylate, 2-hydroxypropyl acrylate, 3-hydroxypropyl acrylate, 3-hydroxyethyl methacrylate, 2-hydroxypropyl methacrylate, 3-hydroxypropyl methacrylate, 4-hydroxybutyl methacrylate, and corresponding esters of other unsaturated acids. For example, ethacrylic acid, crotonic acid, and similar acids of up to about 6 carbon atoms. There may also be employed mono- or di-esters of unsaturated dicarboxylic acids such as maleic acid, fumaric acids, and itaconic acid in which at least one of the esterifying groups contains a hydroxyl group. Examples of such esters include mono(2-hydroxyethyl)maleate,
mono(2-hydroxyethyl fumarate,
bis(2-hydroxyethyl)maleate,
mono(2-hydroxypropyl)maleate,
bis(2-hydroxypropyl)maleate,
mono(2-hydroxyethyl)itaconate,
bis(2-hydroxyethyl)itaconate, and
2-hydroxyethylbutyl maleate.

At least about 0.2 percent by weight of the interpolymer is comprised of the monomer containing active hydrogen atoms and such monomer is usually present in an amount within the range of from about 0.5 percent to about 20 percent by weight of the total weight of the interpolymer.

By "reactive hydrogen atom" is meant that the acrylic monomer contains a pendant hydrogen atom or atoms, such as OH or COOH, which are capable of crosslinking with a metal alkoxide such as tetrabutyl titanate. The monomers may contain one or more groups containing reactive hydrogen atoms. The location of the reactive hydrogen atom is not critical but it is preferred that the hydrogen atom be connected to a hetero atom such as O, N, or S.

There can also be included in the adhesive up to about 59.8 percent by weight of one or more other addition copolymerizable monomers which contain an ethylenically unsaturated linkage, such linkage being the only reactive functional group in the monomer. For example, there is often included a vinyl ester of a saturated carboxylic acid, such as vinyl acetate, vinyl propionate or vinyl butyrate. Other optional monomers which will copolymerize by addition reaction that can be employed include alkyl acrylates other than those above, and alkyl methacrylates having from 1 to 20 carbon atoms or more in the alkyl group, such as methyl methacrylate, butyl methacrylate, octadecyl methacrylate, lauryl methacrylate, and the like.

It will be recognized that the combination of monomers used to make up the interpolymer will be such as to provide a normally tacky pressure-sensitive material. Thus, within the skill of the art, the interpolymer can include essentially any ethylenic monomer or mixture of monomers copolymerizable with the other components and which do not contain additional reactive functional groups and which do not, in combination with those components, provide unsatisfactory properties such as unsatisfactorily reduced tack. The term "reactive functional groups" herein refers to functional groups with which the metal alkoxide reacts, such as hydroxyl, carboxyl, etc. Such other monomers can be of widely varying types, depending upon the specific alkyl acrylates, hydroxyalkyl esters, carboxylic acids, and other monomers in the interpolymer. For instance, there can be utilized in certain cases monoolefinic hydrocarbons, such as styrene and vinyl toluene; halogenated monoolefinic hydrocarbons, such as vinyl chloride and vinylidene chloride; unsaturated esters, such as isopropenyl acetate and dimethyl maleate; and dienes, such as 1,3-butadiene.

As indicated above, the interpolymers herein are normally tacky and the composition of the interpolymer is chosen in accordance with known practice so as to provide a product of suitable tack. Tack is normally inversely related to the plasticity of the polymer, which is a measure of the deformability of the polymer under an applied load. The interpolymers herein may have a negligible or unmeasurably low standard Williams plasticity number or a Williams plasticity number as low as possible before reaction with the metal alkoxide and in some cases it is preferred that they have negligible Williams plasticity numbers and preferably have a plasticity number of at least about 2.0 after that reaction. A great advantage of the method of this invention is that it allow the use of essentially liquid starting materials or materials with no or low plasticity to be transformed into useful adhesives. The plasticity after such reaction is in most cases below about 3.5, although where the plasticity is above this level, some added tackifiers may be provided to produce the desired properties.

The interpolymer, as described above, is reacted with a metal alkoxide to provide the adhesive polymer employed in the invention.

The metal alkoxides which may be used herein may be any metal alkoxide such as those having the formula $R_nT(OR_1)_z$, wherein T is a metal selected from the group consisting of Groups II, III, IV and V of the Periodic Table; R is selected from the group consisting of alkyl radicals of from 1 to 8 carbon atoms such as methyl, ethyl butyl, iso-octyl and the like and aryl radicals of from 6 to 16 carbon atoms such as benzyl. $R_1$ is selected from the group consisting of aliphatic and substituted aliphatic radicals containing from 1 to 18 carbon atoms, such as alkyl groups, allyl groups and the like; $n$ is an integer whose value is zero or greater and $z$ is an integer of at least 2, wherein the sum of $n+z$ is greater than one (1) and is equal to the valence of the metal represented by T.

Examples of metal alkoxides for use in the practice of this invention include the following: magnesium ethoxide, calcium ethoxide, strontium ethoxide, barium ethoxide, aluminum ethoxide, aluminum isopropoxide, lanthanum t-butoxide, ferric ethoxide, ferric isopropoxide, titanium ethoxide, titanium isopropoxide, titanium butoxide, cupric isopropoxide, cobaltic isopropoxide, zinc isopropoxide, nickel isopropoxide, zirconium ethoxide, zirconium isopropoxide, zirconium butoxide, hafnium ethoxide, hafnium isopropoxide, cerium isopropoxide, germanium isopropoxide, stannic ethoxide, stannic isopropoxide, vanadium isopropoxide, chromium t-butoxide, niobium ethoxide, niobium isopropoxide; also included are double alkoxides such as sodium zirconium isopropoxide, potassium zirconium ethoxide, magnesium aluminum ethoxide, potassium aluminum butoxide, sodium stannic ethoxide and alkyl metal alkoxides such as diethoxy ethyl aluminum, dibutoxy diphenyl titanium, phenyl triisopropoxy titanium, dimethyl diisopropoxy titanium, dibutyl dimethoxy tin and the like.

The preferred metal alkoxides are aluminum isopropoxide or titanium esters such as alkyl titanates such as ortho titanic acid esters of monofunctional alcohols and tetraaryl esters. Examples of alkyl titanates include tetramethyl titanate, tetraethyl titanate, tetrapropyl titanate, tetraisopropyl titanate, tetrabutyl titanate, tetra-2-ethylhexyl titanate, and tetrastearyl titanate. As indicated, tetraphenyl titanate and other tetraaryl esters are also included.

The above alkoxides may be used if the acrylic monomer containing a COOH group is used as the acrylic monomer having the reactive hydrogen atom. It has been found that the adhesives produced using these alkoxides and the acid monomers have excellent strength.

The metal alkoxides, including the lower alkyl titanates, have the disadvantage of being extremely reactive and have a tendency to gel in combination with the acrylic interpolymer. This tendency limits the ability to store the formulated adhesive for any appreciable period. While this tendency can be minimized to some extent by proper choice of the components of the interpolymer and the level of titanate ester utilized, it has been found that a chelated metal alkoxide unexpectedly will solve any stability problems while retaining the strength. It has been found that the chelated esters are not subject to the storage disadvantage and provide formulated adhesives which can be stored for relatively long periods without substantial increase in viscosity.

The chelated metal alkoxides may be used where the acrylic monomer containing the reactive hydrogen atom is either an OH or COOH containing monomer to achieve the improved strength and also the vastly improved shrink resistance and stability.

The use of OH containing monomers with chelated metal alkoxides is especially preferred when a composition has a relatively high solids content such as 55 percent or greater as these compositions become much less stable and tend to gel on storage at ambient and slightly elevated temperatures when a chelated metal alkoxide is not used. It has been found that on storage at low temperature the viscosity of those compositions using a non-chelated metal alkoxide rises four times as much as the viscosity of a similar composition with a chelated metal alkoxide. It has also been found that the original viscosity prior to storage of these same compositions varies greatly as there appears to be an immediate reaction with the non-chelated metal alkoxides, thus compositions having OH containing groups and non-chelated metal alkoxides show an immediate rise in viscosity whereas those same compositions with chelated metal alkoxides show no immediate rise in viscosity.

The preferred chelated metal alkoxides are chelated aluminum esters.

The chelated titanium esters which are employed in the preferred embodiment of the invention are formed by coordinate bonding between titanium and electron donating atoms, such as oxygen or nitrogen. Thus, the reaction of alkyl esters of titanic acid with amino alcohols, keto alcohols, glycols, or similar polyfunctional alcohols as the ligands, particularly acetyl acetone, causes replacement of at least two of the alkoxy groups of the ester with at least 2 moles of the ligand. Although these chelated esters are not pure compounds and may be partially polymerized by intermolecular alcoholysis, they can be represented by the following generalized formula:

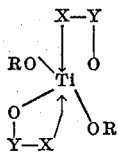

In the above formula, X is oxygen or nitrogen, Y is an alkylene radical of 2 to 3 carbon atoms, and each R is an alkyl of up to about 12 carbon atoms or XYOH. Such chelated esters can be formed by various methods, such as by reaction of a tetraalkyl titanate with a glycol, such as 2-ethyl-1,3-hexanediol; a diketone, such as 2,4-pentanedione; a hydroxy acid, such as lactic acid, citric acid, or tartaric acid; a keto ester, such as acetoacetic ester; or with an aminoalcohol, such as diethanolamine or triethanolamine. The preparation of such chelated esters is described in U.S. Pats. Nos. 2,453,520, 2,468,916, 2,870,181 and 2,824,114, and in British Pat. No. 74,113.

The preferred chelated esters employed in the invention are those which are commercially available, which include those formed from octylene glycol, triethanolamine, 2,4-pentanedione, and lactic acid. Thus completely chelated esters such as titanium acetylacetonate, when added to the interpolymer solution forms a more stable, latently crosslinkable solution, which upon evaporation of solvent forms a crosslinked polymer matrix.

It is noted that the chelating agent such as the glycol, hydroxy acid, keto ester or aminoalcohol may also be added to the composition as an excess to achieve better stability. Small excesses such as 1 or 2 percent (based on polymer solids) of the chelating agents have been found to be extraordinarily effective. The chelating agent may be added directly to the composition or it may be added to the metal alkoxide. The mechanism for the increased stability due to the presence of excess chelating agent is not understood.

The relative proportions of acrylic interpolymer and metal alkoxide employed in producing the adhesive polymers of the invention can be varied and depend to some extent upon the nature of the interpolymer and the particular metal alkoxide or chelated metal alkoxide utilized. In most cases, however, there is employed from about 0.1 percent to about 5 percent by weight of the metal alkoxide or chelated metal alkoxide based on the total polymer.

The reaction between the metal alkoxide or chelated metal alkoxide and the acrylic interpolymer does not require special conditions. Ordinarily, the reaction takes place upon coating and drying the mixture at moderate temperatures, such as 50° C. to 150° C.; higher or lower temperatures can be used, depending upon the desired reaction time. The metal alkoxide is believed to react with the reactive hydrogen atom of the acrylic monomer interpolymerized with the alkyl acrylate, but not all of the reactive hydrogen atoms in the interpolymer need be reacted with the metal alkoxide, and it may be desirable in some instances to obtain improved adhesion to permit some hydrogen atoms to remain unreacted.

The adhesive composition is essentially composed of the adhesive polymer, described above, in an organic solvent. In order to provide maximum storage stability, it is important that the solvent contain a substantial proportion, e.g., at least about 20 percent by weight, of an alcohol. Any liquid alcohol of suitable volatility can be employed, although lower alkanols, such as ethanol, propanol, isopropanol and butanol, are preferred. Other alcohol solvents that can be utilized include methyl Cellosolve, butyl Cellosolve, diacetone alcohol, and the like. The remainder of the solvent can be any of the organic materials ordinarily utilized for this purpose and in which the interpolymer is soluble or dispersible, including esters, ketones, hydrocarbons, etc. The preferred solvents are aliphatic hydrocarbon solvents, such as heptane, as they permit the coating of the adhesive directly onto solvent sensitive backings with facility and they dry quickly. It is also preferable that as little water be present as possible as the water hydrolizes and deactivates the metal alkoxide.

There can also be included in the adhesive composition additive materials which do not affect the basic properties of the adhesive. Fillers, tackifiers, antioxidants, stabilizers, and the like are thus sometimes added to the formulated adhesive.

The adhesive can be employed in various forms. For instance, it can be cast as a free film interleaved between sheets of release paper and employed in a transfer operation. In other methods of utilization, the adhesive is coated onto a backing member and dried to provide pressure-sensitive adhesive coated materials, such as tapes, sheets or panels. Alternatively, the adhesive may be coated on to a release material and then dried and transferred to a backing member. Cellophane, vinyls, cloth, Mylar, rubber, various laminates, and other such flexible materials, as well as wood, metal, hardboard and other less flexible backings, can be coated in this manner. The adhesives of this invention may also be used for decorative coatings, outdoor decals, and signs. In some cases, the adhesive can be used as a liquid adhesive and applied just prior to use.

In any event, the dried adhesive composition forms a tacky adhesive which adheres to various substrates to provide a bond of high cohesive strength, thus, making these adhesives especially desirable in uses where holding ability and retention of strength over a period of time are necessary.

There are set forth below several examples which serve to illustrate the invention. All parts and percentages in the examples, as well as throughout the specification, are by weight and are based on nonvolatile solids content unless otherwise indicated.

EXAMPLE 1

To an interpolymer of 70 percent 2-ethylhexyl acrylate, 26 percent vinyl acetate, 3.5 percent hydroxyethyl methacrylate, and 0.5 percent acrylic acid having a solids content of 30 percent in 46 percent isopropyl acetate and 54 percent isopropyl alcohol solvent was added 0.6 percent based on non-volatile solids content of a chelated titanium acid ester (Tyzor AA) having a formula:

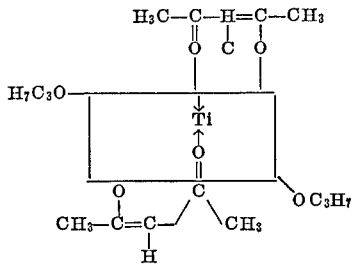

The above adhesive was compared to the same adhesive which has not been reacted with the titanium acid ester. The latter adhesive had a Williams plasticity number of only 1.87 after drying for one hour at 165° F., and the adhesive of this invention had a Williams plasticity number of 3.45 after the same drying cycle.

EXAMPLE 2

To a 30 percent solids solution of an interpolymer of 65 percent 2-ethylhexyl acrylate, 32.3 percent vinyl acetate, 2 percent 2-hydroxyethyl acrylate, and 0.7 percent acrylic acid in a solvent solution containing 30 percent ethyl acetate and 70 percent ethanol was added various amounts of Tyzor AA, and the resultant adhesives were dried for one hour at 165° F. Table I below illustrates the change in plasticity number and the constant tack properties that resulted.

TABLE I

| Percent Tyzor AA | Williams plasticity number | Tack (inches) |
| --- | --- | --- |
| 0 | 1.87 | 5 |
| 0.1 | 2.09 | 5¼ |
| 0.2 | 2.44 | 4¾ |
| 0.3 | 2.73 | 4¾ |
| 0.4 | 2.97 | 4 |

The tack is measured by the rolling ball test. In this test the coated substrate is placed adjacent to an inclined plane having a specified angle of incline and a specified length (in this case the surface is 5 inches long and has an incline of 20 degrees). A metal (steel) ball having a specified weight (in this case 2 grams) is rolled down the incline onto the coated surface and the length that the ball rolls on the coated surface before it is stopped by same is the value given the tack of the coating. Thus, adhesives having better tack would roll fewer inches than those having tack not quite so good.

As seen above, the Williams plasticity number increases significantly, while the tack remains approximately the same as the amount of titanic acid ester is increased.

EXAMPLE 3

A pressure-sensitive adhesive is prepared by adding 0.3 percent of Tyzor AA based on non-volatile solids content to a 36 percent solids interpolymer of 64 percent 2-ethylhexyl acrylate, 34.3 percent vinyl acetate, and 1.7 percent acrylic acid in a solvent containing 8.5 percent ethyl acetate, 51.5 percent heptane, and 40 percent isopropyl alcohol.

The above pressure-sensitive adhesive composition was applied to a 5-inch by 5-inch calendered vinyl film and dried by baking for 2½ minutes at 230° F. The dry film weight of the adhesive was 2 grams per 100 square inches. The shrink resistance of this adhesive was then compared to the shrink resistance of the same adhesive without the Tyzor AA on calendered vinyl film.

The shrink resistance of the adhesive compositions was tested by bonding the vinyl sheets to stainless steel with the adhesives, and subjecting to 158° F. temperature for 3 days. The shrinkage was measured as the sum of the shrinkage of opposite sides of the adhesive, and recorded as a percentage of the original size of the vinyl substrate.

In the above test, shrinkage was measured in both the machine direction and the cross direction. The adhesive produced using the Tyzor AA showed a shrinkage of only 0.7 percent in the machine direction and 0.4 percent in the cross direction, compared to the adhesive produced without the titanate, which shrunk 3.0 percent in the machine direction and 1.5 percent in the cross direction.

EXAMPLE 4

A pressure-sensitive adhesive was prepared by cold blending 0.3 percent based on non-volatile solids content of a further chelated titanic acid ester formed by reacting 2 moles of acetyl acetone with 1 mole of Tyzor AA (which is a 65 percent solution in isopropyl alcohol) with a 37 percent solids solution of an interpolymer of 64.1 percent of 2-ethylhexyl acrylate, 34.2 percent vinyl acetate, 1 percent hydroxyethyl acrylate, and 0.7 percent acrylic acid in a solvent comprising 48.4 percent heptane, 48.6 percent isopropyl alcohol, and 3 percent ethyl acetate.

The stability of this adhesive was demonstrated by measuring the viscosity of the adhesive at various times during a three-week interval at which the adhesive was kept at room temperature. The initial Gardner-Holdt viscosity was N–O, and after 1 week and 3 weeks, the viscosity was O. Thus, it is seen that the further chelated titanium acid ester produces stable adhesives.

EXAMPLE 5

A pressure-sensitive adhesive was prepared by cold blending 0.3 percent by weight based on non-volatile solids content of Tyzor AA with a 23 percent solids solution of an interpolymer of 62 percent 2-ethylhexyl acrylate, 30 percent vinyl acetate, 3.5 percent hydroxyethyl methacrylate, 3.5 percent diacetone acrylamide, and 1 percent acrylic acid in a solvent of 50.7 percent isopropyl acetate and 49.3 percent isopropyl alcohol.

The shrink resistance of the adhesive was tested as in Example 3. After 7 days at 158° F., the total shrinkage of the adhesive in the machine direction and the cross direction was only 0.2 percent.

EXAMPLE 6

A reactor was charged with 53.5 parts of 2-ethyl hexyl acrylate, 439.5 parts of vinyl acetate, 235.5 parts of heptane and 1.8 parts of benzoyl peroxide. The contents were heated at reflux for 10 minutes at 73° C. and a blend of 748.5 parts of 2-ethyl hexyl acrylate, 12.5 parts of hydroxy ethyl acrylate, 277.5 parts of heptane, and 1.8 parts of benzoyl peroxide was added over a two-hour period at a temperature of 86° C. To the reactants were then added 194 parts of heptane over a half hour period and, after 15 minutes, a blend of 21 parts of ethyl acetate, 1.8 parts of benzoyl peroxide, and 133 parts of heptane were added over a 40 minute period. After 20 minutes was then added a blend of 21 parts of ethyl acetate, 1.8 parts of benzoyl peroxide and 97.5 parts of heptane over a 40 minute period and after 20 minutes a blend of 21 parts of ethyl acetate, 1.8 parts of benzoyl peroxide and 88.5 parts of heptane over another 40 minute period. After an hour and a half seven hundred and seventy-three parts of isopropyl alcohol were added over a half-hour period and the reactants were cooled and a blend of 5.3 parts of Tyzor AA, 399 parts of isopropyl alcohol and 240 parts of heptane were added.

The interpolymer prior to the addition of the chelated titanate had a Williams plasticity number of 1.31 and the resulting adhesive had a Williams plasticity number of 2.43.

EXAMPLE 7

A reactor was charged with 71.3 parts of 2-ethyl hexyl acrylate, 579.2 parts of vinyl acetate, 324 parts of heptane and 2.4 parts of benzoyl peroxide and heated to reflux at 73° C. Over a two-hour period a blend of 998 parts of 2-ethyl hexyl acrylate, 8.3 parts of hydroxyethyl acrylate, 11.7 parts of acrylic acid, 380 parts of heptane and 2.4 parts of benzoyl peroxide was added at a temperature of 84° C. and 259.2 parts of heptane were added over the next 45 minutes and then the reactants were held for 15 minutes. A blend of 28.1 parts of ethyl acetate, 2.4 parts of benzoyl peroxide, and 177 parts of heptane was added over the next 45 minutes, and after 15 minutes a blend of 28.1 parts of ethyl acetate, 2.4 parts of benzoyl peroxide, and 130 parts of heptane was added over the next 45 minutes and after 15 minutes a blend of 28.1 parts of ethyl acetate, 2.4 parts of benzoyl peroxide and 108 parts of heptane was added over the next 45 minutes and held for an hour and a half and cooled. To the solution which had a Williams plasticity number of 1.37 was added a blend of 800 parts of isopropyl alcohol, 4.12 parts of aluminum-tri-(acetyl acetonate), and 41.7 parts of toluene and 16 parts of acetyl acetone. The resulting adhesive had a Williams plasticity number of 3.04 and a viscosity of 3,340 centipoises. The adhesive was stored in a can at 120° F. for 2 weeks and at the end of that time had a viscosity of 2,500 centipoise and a Williams plasticity number of 2.99.

EXAMPLE 8

A reactor was charged with 82 parts of 2-ethyl hexyl acrylate, 694 parts of vinyl acetate, 2.8 parts of benzoyl peroxide, 350 parts of heptane, and 100 parts of isopropyl alcohol and heated to reflux at 71° C. A blend of 1,200 parts of 2-ethyl hexyl acrylate, 14 parts of acrylic acid, 10 parts of hydroxy ethyl acrylate and 50 parts of isopropyl alcohol was added over a two-hour period and a blend of 72 parts of heptane and 20 parts of isopropyl alcohol was added over the next 45 minutes and after 15 minutes a blend of 15 parts of ethyl acetate and 2.8 parts of benzoyl peroxide was added over the next 40 minutes and after 20 minutes 15 parts of ethyl acetate and 2.8 parts of benzoyl peroxide was added over the next 40 minutes and after 20 minutes 15 parts of ethyl acetate and 2.8 parts of benzoyl peroxide were added. After 20 minutes, 15 parts of ethyl acetate and 2.8 parts of benzoyl peroxide were added over 40 minutes and held for one and one half hours and cooled. The interpolymer, at this point, had a Williams plasticity number of less thn 1.0 millimeter. To the interpolymer was then added a blend of 24.5 parts of the further chelated titanic acid ester of Example 4 and 20 parts of acetyl acetone and 40 parts of isopropyl alcohol. The Williams plasticity number was then 2.57 and the solids content was 71.5 percent and the viscosity was 23,400 centipoises. After 2 weeks can storage at 120° F. the solids were still 71 percent and the viscosity was 23,700 centipoises.

EXAMPLE 9

To an interpolymer comprising 63.9 parts of 2-ethyl hexyl acrylate, 34.2 parts of vinyl acetate and 0.35 part of acrylic acid as a 37 percent solids solution in 46 percent isopropyl acetate and 54 percent isopropyl alcohol was added 0.37 part of isopropoxy titanate. The resulting adhesive had a dead load strength of 30 minutes and a cured Williams plasticity number of 2.52 as compared to an uncured plasticity number of 1.82 prior to the titanate addition.

EXAMPLE 10

To an adhesive formed using the interpolymer of Example 1 and isopropoxy titanate as the crosslinking agent was added one percent by weight (based on dry polymer) of acetyl acetone (a chelating agent). The relative storage stability of the adhesive with the added chelating agent to that of the adhesive without the added chelating agent is shown below:

|  | Original viscosity, cps. | Viscosity after 4 weeks at 120° F., cps. |
| --- | --- | --- |
| Example 10 | 13,750 | 12,550 |
| Adhesive with no chelating agent | 13,850 | 23,700 |

EXAMPLE 11

A reactor was charged with 82 grams of 2-ethyl hexyl acrylate, 658 grams of vinyl acetate, 2.8 grams of benzoyl peroxide, 350 grams of heptane, 100 grams of isopropyl alcohol, and 20 grams of 2-hydroxy ethyl acrylate and the reactants were heated to reflux and held for 10 minutes. Over a two-hour period 1,200 grams of ethyl hexyl acrylate, 40 grams of hydroxy ethyl acrylate, and 50 grams of isopropyl alcohol were added and over a 45 minute period was added a blend of 72 grams of heptane and 20 grams of isopropyl alcohol. The reactants were held for an additional 15 minutes at reflux and over a 40 minute period 15 grams of ethyl acetate and 2.8 grams of benzoyl peroxide were added. The reactants were held for an additional 20 minutes and over a 40 minute period 15 grams of ethyl acetate and 218 grams of benzoyl peroxide were added. After 20 minutes at reflux, 15 grams of ethyl acetate and 2.8 grams of benzoyl peroxide were added over a 40 minute period. The reactants were held at reflux for one and one half hours and then cooled.

To the above composition were added a 50 percent solution in isopropyl alcohol of Tyzor 4AA (the further chelated titanate of Example 4), 220 grams of isopropyl alcohol, 20 grams of acetyl acetonate (chelating agent). The resulting composition had a Williams plasticity number of 2.57, a solids content of 65.6 percent, an initial viscosity of 6,750 centipoises (Brookfield viscosity with a number 6 spindle at 20 revolutions per minute).

The above composition containing the chelated metal alkoxide was compared to a composition prepared by substituting the Tyzor 4AA, isopropyl alcohol, and acetyl acetonate addition with 20 grams of isopropoxy titanate, and 240 grams of isopropyl alcohol. This composition had a solids content of 68.2 percent, a Williams plasticity number of 2.66 and an initial Brookfield viscosity of 58,500 centipoises (No. 6 spindle 10 revolutions per minute).

As seen above the initial viscosity of the non-chelated metal alkoxide composition was approximately 9 times that of the composition containing the chelated metal alkoxide.

The can storage stability of the two compositions was tested by keeping samples of both compositions in a flask for two weeks at 120° F. and an additional two weeks at 120° F. and determining the viscosity and Williams plasticity number at each time. The results were as follows:

|  | Total solids percent | Viscosity (cps.) | Williams plasticity number |
| --- | --- | --- | --- |
| Composition with metal alkoxide: |  |  |  |
| Original | 68.2 | 58,200 | 2.66 |
| 2 wks. at 120° F | 70 | 240,000 | 0.92 |
| 4 wks. at 120° F | 71.6 | Gelled | 0.80 |
| Composition with chelated metal alkoxide: |  |  |  |
| Original | 65.6 | 6,750 | 2.57 |
| 2 wks. at 120° F | 66.6 | 8,250 | 1.98 |
| 4 wks. at 120° F | 66.8 | 7,740 | 1.73 |

As seen above, the composition containing the non-chelated metal alkoxide showed a sharp drop in Williams plasticity number along with a sharp rise in viscosity after the specified can storage period; whereas, the composition containing the chelated metal alkoxide remained stable in viscosity and showed a lower rate of plasticity number fall-off.

Although specific examples of the invention have been set forth hereinabove, it is not intended that the invention be limited solely thereto, but to include all the variations and modifications within the scope of the appended claims.

What is claimed is:

1. A pressure-sensitive adhesive composition which when dry forms a tacky adhesive of high cohesive strength, said composition comprising an adhesive polymer formed by the reaction of
   (A) a normally tacky interpolymer of monomers consisting essentially of
     (1) at least 40 percent by weight of one or more alkyl acrylates having up to about 18 carbon atoms in the alkyl group,
     (2) at least about 0.20 percent by weight of an acrylic monomer containing one or more groups containing reactive hydrogen atoms, and
     (3) up to about 59.8 percent of one or more copolymerizable monomers containing an ethylenically unsaturated linkage as the only reaction functional group, said copolymerizable monomers having no more than 25 carbon atoms in the molecule; and
   (B) a chelated metal alkoxide having the formula $R_nT(OR_1)_z$ wherein T is a metal selected from the group consisting of Groups II, III, IV, and V of the Periodic Table, R is selected from the group consisting of alkyl radicals of from 1 to 8 carbon atoms and aryl radicals of from 6 to 16 carbon atoms, $R_1$ is selected from the group consisting of aliphatic and substituted aliphatic radicals containing from 1 to 18 carbon atoms, $n$ is an integer whose value is 0 or greater, and $z$ is an integer whose value is at least 2 wherein the sum of $n+z$ is equal to the valence of the metal represented by T.

2. The adhesive composition of claim 1 in which said chelated metal alkoxide is a chelated ester of titanic acid.

3. The adhesive composition of claim 1 in which said adhesive polymer is dissolved in liquid organic solvent comprising at least about 20 percent by weight of one or more substantially anhydrous alcohols.

4. The adhesive composition of claim 3 in which the remainder of the liquid organic solvent is substantially a liquid aliphatic hydrocarbon.

5. The adhesive composition of claim 1 in which said alkyl acrylates have an average of from about 4 to about 10 carbon atoms in the alkyl groups.

6. The adhesive composition of claim 1 in which said interpolymer contains from about 10 to about 59.8 percent by weight of a vinyl ester of a saturated monocarboxylic acid.

7. The adhesive composition of claim 1 in which said interpolymer contains from about 0.2 to about 20 percent by weight of ethylenically unsaturated carboxylic acid.

8. The adhesive composition of claim 1 in which said interpolymer contains from about 0.2 to about 20 percent by weight of a hydroxyalkyl ester of an ethylenically unsaturated carboxylic acid.

9. The adhesive composition of claim 1 in which the chelated metal alkoxide is present in an amount between about 0.1 and about 5.0 percent of the total weight of the interpolymer and the chelated metal alkoxide.

10. The adhesive composition of claim 1 wherein the chelated metal alkoxide is a chelated aluminum-tri(acetyl acetonate).

11. The adhesive composition of claim 1 comprising excess chelating agent.

12. The adhesive composition of claim 1 wherein the interpolymer has an unmeasurably low Williams plasticity number.

13. A pressure-sensitive adhesive composition which when dry forms a tacky adhesive of high cohesive strength, said composition comprising an adhesive polymer formed by the reaction of
   (A) a normally tacky interpolymer of monomers consisting essentially of
     (1) at least about 40 percent by weight of one or more alkyl acrylates having an average of from about 4 to about 10 carbon atoms in the alkyl groups,
     (2) from about 0.2 to about 20 percent by weight of an acrylic monomer containing one or more COOH groups, and
     (3) up to about 59.8 percent by weight of one or more copolymerizable monomers containing an ethylenically unsaturated linkage as the only reactive functional group, said copolymerizable monomers having no more than 25 carbon atoms in the molecule; and
   (B) a metal alkoxide having the formula $R_nT(OR_1)_z$ wherein T is a metal selected from the group consisting of Groups II, III, IV, and V of the Periodic Table, R is selected from the group consisting of alkyl radicals of from 1 to 8 carbon atoms and aryl radicals of from 6 to 16 carbon atoms, $R_1$ is selected from the group consisting of aliphatic and substituted aliphatic radicals containing from 1 to 18 carbon atoms, $n$ is an integer whose value is 0 or greater and $z$ is an integer whose value is at least 2 wherein the sum of $n+z$ is greater than 1 and is equal to the valence of the metal represented by T.

14. The adhesive composition of claim 13 in which said adhesive polymer is dissolved in liquid organic solvent comprising at least about 20 percent by weight of one or more substantially anhydrous alcohols.

15. The adhesive composition of claim 14 in which said alcohol is a lower alkanol.

16. The adhesive composition of claim 15 wherein the remaining organic solvent is a liquid aliphatic hydrocarbon.

17. The adhesive composition of claim 13 in which said interpolymer contains from about 0.2 to about 20 percent by weight of ethylenically unsaturated carboxylic acid.

18. The adhesive composition of claim 17 in which said acid is acrylic acid or methacrylic acid.

19. The adhesive composition of claim 13 in which said interpolymer contains from about 10 to about 59.8 percent by weight of a vinyl ester of a saturated monocarboxylic acid.

20. The adhesive composition of claim 13 in which said metal alkoxide is present in an amount between about 0.1 and about 5 percent of the total weight of the interpolymer and the metal alkoxide.

21. The adhesive composition of claim 13 wherein the metal alkoxide is an organic ester of titanic acid.

22. The adhesive composition of claim 13 wherein the metal alkoxide is a chelated metal alkoxide.

23. The adhesive composition of claim 22 additionally comprising a chelating agent.

24. The adhesive composition of claim 13 wherein the interpolymer has an unmeasurably low Williams plasticity number.

25. A pressure-sensitive adhesive coated article comprising a backing member having thereon a layer of the adhesive composition of claim 1.

26. A pressure-sensitive adhesive coated article comprising a backing member having thereon a layer of the adhesive composition of claim 13.

27. A pressure-sensitive film adhesive comprising a dried film of the adhesive composition of claim 1.

28. A pressure-sensitive film adhesive comprising a dried film of the adhesive composition of claim 13.

References Cited
UNITED STATES PATENTS

| | | | |
|---|---|---|---|
| 3,576,755 | 4/1971 | Patella | 260—45.75 |
| 2,838,418 | 6/1958 | Starkweather | 260—429.5 |
| 3,222,419 | 12/1965 | Jubilee | 117—122 PA |
| 2,453,520 | 11/1948 | Langkammer | 260—429.5 |
| 2,468,916 | 5/1949 | Booge | 260—429.5 |
| 2,824,114 | 2/1958 | Bostwick | 260—429.5 |
| 2,870,181 | 1/1959 | Shacklett | 260—429.5 |
| 3,707,518 | 12/1972 | Bemmels | 260—80.71 |

THEODORE MORRIS, Primary Examiner

U.S. Cl. X.R.

117—122 P; 260—80.71

REEXAMINATION CERTIFICATE (309th)

United States Patent [19]

Anderson et al.

[11] B1 3,769,254

[45] Certificate Issued Feb. 26, 1985

[54] HIGH STRENGTH PRESSURE-SENSITIVE ADHESIVES

[75] Inventors: Carl C. Anderson, Gibsonia; Rudolf Maska; Suryya K. Das, both of Pittsburgh, all of Pa.

[73] Assignee: National Starch and Chemical Corporation, New York, N.Y.

Reexamination Request:
No. 90/000,483, Dec. 15, 1983

Reexamination Certificate for:
Patent No.: 3,769,254
Issued: Sep. 4, 1973
Appl. No.: 175,691
Filed: Aug. 27, 1971

Related U.S. Application Data

[63] Continuation-in-part of Ser. No. 26,145, Apr. 6, 1970, abandoned.

[51] Int. Cl.³ .................. C08K 5/04; C08K 5/07
[52] U.S. Cl. .................. 524/398; 428/355; 524/357; 524/376; 524/399; 524/502; 525/370
[58] Field of Search .............. 524/762, 398, 399, 357, 524/376, 502; 428/355; 525/370

[56] References Cited

U.S. PATENT DOCUMENTS

| | | | |
|---|---|---|---|
| 3,258,443 | 6/1966 | Cantor et al. | 524/762 |
| 3,532,708 | 10/1970 | Blanc | 524/300 |
| 3,632,546 | 1/1972 | Haung | 524/357 |
| 3,740,366 | 6/1973 | Sanderson et al. | 525/370 |
| 3,769,254 | 10/1933 | Anderson | 525/366 |

OTHER PUBLICATIONS

"Test Methods for Pressure Sensitive Tapes", 6th Ed., 1953.
"The National Paint Dictionary", Stewart, J., 1948, p. 214.
"Paint Testing Manual", 12th Ed., Mar. 1962, p. 131.

*Primary Examiner*—Theodore Morris

[57] ABSTRACT

Pressure-sensitive adhesives having improved cohesive strength are obtained by reacting an acrylic interpolymer containing an interpolymerized acrylic monomer containing one or more groups having reactive hydrogen atoms such as a hydroxyalkyl ester or an ethylenically unsaturated carboxylic acid with a metal alkoxide, chelated metal alkoxides such as chelated titanium esters being particularly preferred. Adhesives produced in this manner have improved cohesive strength and shrink resistance on backings while maintaining good tack and adhesive properties.

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-12, 25, and 27 is confirmed.

Claim 22 is cancelled.

Claims 13 and 23 are determined to be patentable as amended.

Claims 14-21, 24, 26 and 28, dependent on an amended claim, are determined to be patentable.

New claims 29-43 are added and determined to be patentable.

13. A pressure-sensitive adhesive composition which when dry forms a tacky adhesive of high cohesive strength, said composition comprising an adhesive polymer formed by the reaction of
(A) a normally tacky interpolymer of monomers consisting essentially of
  (1) at least about 40 percent by weight of one or more alkyl acrylates having an average of from about 4 to about 10 carbon atoms in the alkyl groups,
  (2) from about 0.2 to about 20 percent by weight of an acrylic monomer containing one or more COOH groups, and
  (3) up to about 59.8 percent by weight of one or more copolymerizable monomers containing an ethylenically unsaturated linkage as the only reactive functional group, said copolymerizable monomers having no more than 25 carbon atoms in the molecule; and
(B) a *chelated* metal alkoxide having the formula $R_nT(OR_1)_z$ wherein T is a metal selected from the group consisting of Groups II, III, IV, and V of the Periodic Table, R is selected from the group consisting of alkyl radicals of from 1 to 8 carbon atoms and aryl radicals of from 6 to 16 carbon atoms, $R_1$ is selected from the group consisting of aliphatic and substituted aliphatic radicals containing from 1 to 18 carbon atoms, n is an integer whose value is 0 or greater and z is an integer whose value is at least 2 wherein the sum of n+z is greater than 1 and is equal to the valence of the metal represented by T.

23. The adhesive composition of claim [22] *13*, additionally comprising a chelating agent.

29. The adhesive composition of claim 13, in which component (A) (2) is present in an amount between 0.2 and 6 percent by weight.

30. The adhesive composition of claim 29, in which said chelated metal alkoxide is present in an amount of 0.4 or less equivalents per equivalent of component (A) (2).

31. The adhesive composition of claim 30, in which said composition after cure has a Williams plasticity number of 2.0 to 3.5.

32. The adhesive composition of claim 30, in which added chelating agent is present in excess up to 2 percent by weight based on polymer solids.

33. The adhesive composition of claim 29, in which added chelating agent is present in excess up to 2 percent by weight based on polymer solids.

34. The adhesive composition of claim 29, in which said chelated metal alkoxide is present in an amount of 0.4 or less equivalents per equivalent of component (A) (2), in which said composition after cure has a Williams plasticity number of 2.0 to 3.5, and in which an added chelating agent is present in excess up to 2 percent by weight based on polymer solids.

35. The adhesive composition of claim 29, in which said composition after cure has a Williams plasticity number of 2.0 to 3.5.

36. The adhesive composition of claim 13, in which said composition after cure has a Williams plasticity number of 2.0 to 3.5.

37. The adhesive composition of claim 13, in which said chelated metal alkoxide is present in an amount of 0.4 or less equivalents per equivalent of component (A) (2).

38. The adhesive composition of claim 37, in which said composition after cure has a Williams plasticity number of 2.0 to 3.5.

39. The adhesive composition of claim 29, in which said adhesive polymer is dissolved in liquid organic solvent comprising at least about 20 percent by weight of one or more substantially anhydrous alcohols.

40. The adhesive composition of claim 29, in which said chelated metal alkoxide is present in an amount of 0.4 or less equivalents per equivalent of component (A) (2), and in which said adhesive polymer is dissolved in liquid organic solvent comprising at least about 20 percent by weight of one or more substantially anhydrous alcohols.

41. The adhesive composition of claim 30, in which said composition after cure has a Williams plasticity number of 2.0 to 3.5, and in which said adhesive polymer is dissolved in liquid organic solvent comprising at least about 20 percent by weight of one or more substantially anhydrous alcohols.

42. The adhesive composition of claim 30, in which added chelating agent is present in excess up to 2 percent by weight based on polymer solids, and in which said adhesive polymer is dissolved in liquid organic solvent comprising at least about 20 percent by weight of one or more substantially anhydrous alcohols.

43. The adhesive composition of claim 29, in which said chelated metal alkoxide is present in an amount of 0.4 or less equivalents per equivalent of component (A) (2), in which said composition after cure has a Williams plasticity number of 2.0 to 3.5, in which an added chelating agent is present in excess up to 2 percent by weight based on polymer solids, and in which said adhesive polymer is dissolved in liquid organic solvent comprising at least about 20 percent by weight of one or more substantially anhydrous alcohols.

* * * * *